(12) United States Patent
Iszlai et al.

(10) Patent No.: US 7,464,160 B2
(45) Date of Patent: Dec. 9, 2008

(54) PROVISIONING GRID SERVICES TO MAINTAIN SERVICE LEVEL AGREEMENTS

(75) Inventors: Gabriel Iszlai, Toronto (CA); Andrew Niel Trossman, North York (CA); Paul Darius Vytas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 10/870,386

(22) Filed: Jun. 17, 2004

(65) Prior Publication Data

US 2006/0047802 A1  Mar. 2, 2006

(51) Int. Cl.
*G06F 15/173* (2006.01)
(52) U.S. Cl. ............... 709/224; 709/223; 709/225; 709/226
(58) Field of Classification Search ........... 709/224, 709/223, 225, 226
See application file for complete search history.

(56) References Cited

U.S. PATENT DOCUMENTS

| | | | |
|---|---|---|---|
| 6,516,350 B1 * | 2/2003 | Lumelsky et al. | 709/226 |
| 7,146,353 B2 * | 12/2006 | Garg et al. | 707/2 |
| 2003/0009553 A1 | 1/2003 | Benfield et al. | 709/224 |
| 2003/0099198 A1 | 5/2003 | Kiremidjian et al. | 370/230.1 |
| 2004/0028054 A1 * | 2/2004 | Khurana et al. | 370/395.21 |
| 2004/0044585 A1 | 3/2004 | Franco | 705/26 |
| 2005/0198200 A1 * | 9/2005 | Subramanian et al. | 709/218 |
| 2007/0133409 A1 * | 6/2007 | McKinnon et al. | 370/230 |

OTHER PUBLICATIONS

IBM Tivoli Intelligent Orchestrator and IBM Tivoli Provisioning Manager, Overview Guide, Version 1.1.1, Second Edition, Dec. 2003, Copyright International Business Machines Corporation, pp. 1-44.

* cited by examiner

*Primary Examiner*—Ario Etienne
*Assistant Examiner*—Sahera Halim
(74) *Attorney, Agent, or Firm*—Duke W. Yee; Jeffrey S. LaBaw; Gerald H. Glanzman

(57) ABSTRACT

A method, apparatus, and computer instructions for provisioning grid resources for a set of grid services. The service performance for the set of grid services is monitored. The set of grid services has a set of service level agreements. In response to monitoring service performance, a determination is made as to whether current allocations of grid resources is sufficient to maintain performance levels for the set of grid services to meet the set of service level objectives. In response to the current allocations being insufficient to maintain the performance levels, the current allocations of the grid resources are dynamically reallocated or provisioned for the set of grid services to maintain service levels for the set of grid services.

10 Claims, 4 Drawing Sheets

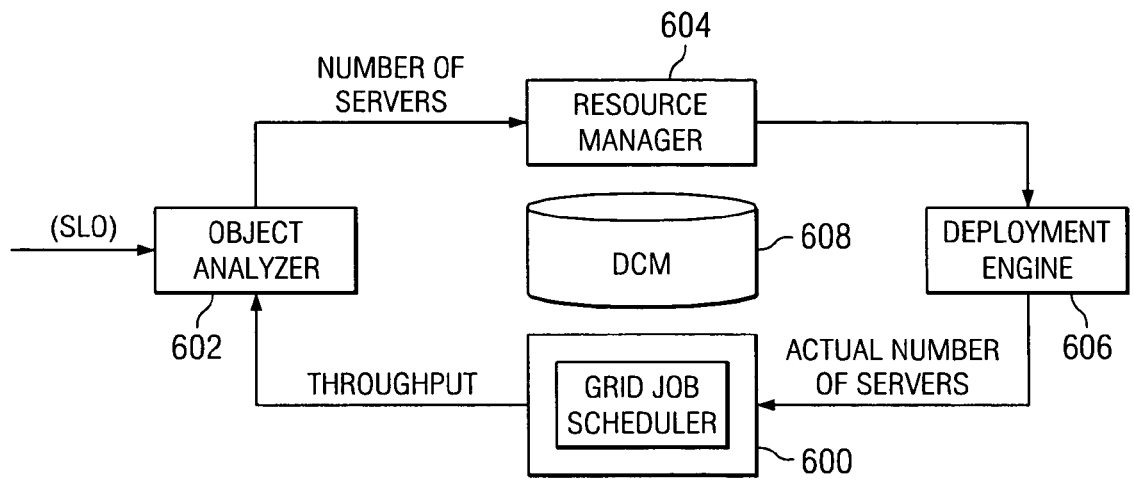
FIG. 6
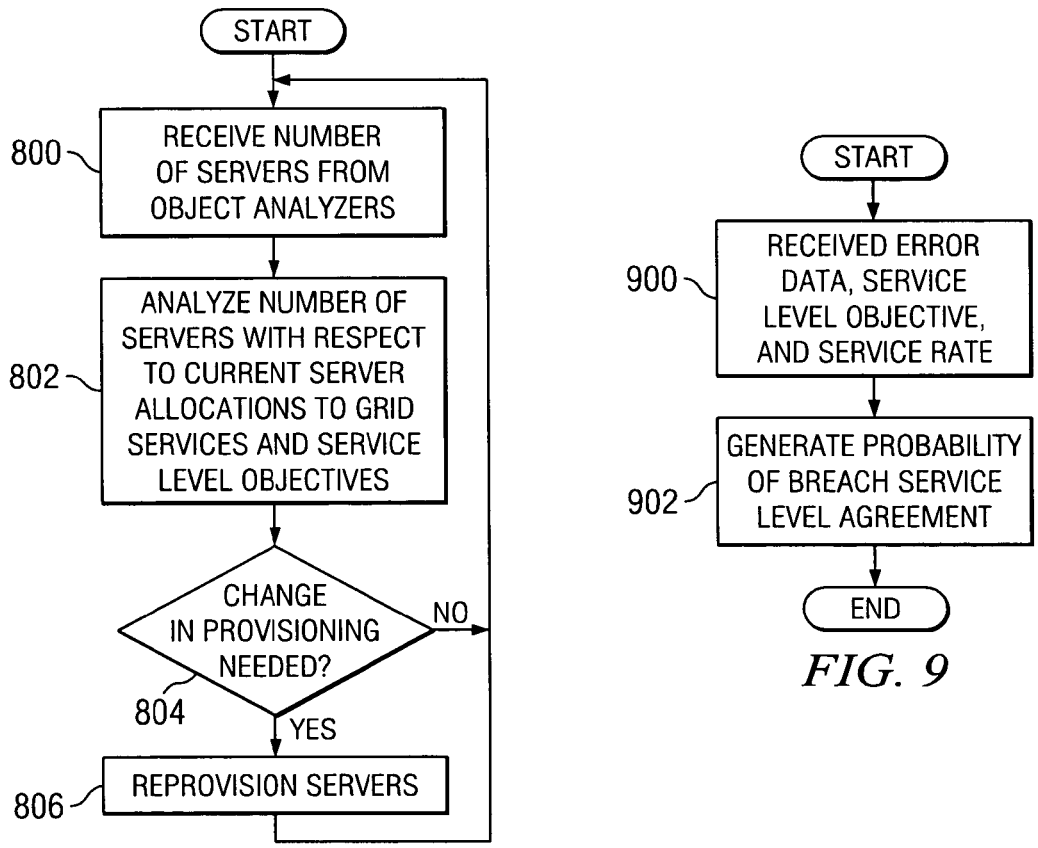
FIG. 8
FIG. 9

PROVISIONING GRID SERVICES TO MAINTAIN SERVICE LEVEL AGREEMENTS

BACKGROUND OF THE INVENTION

1. Technical Field

The present invention relates generally to an improved data processing system and in particular to an improved method and apparatus for managing network resources. Still more particularly, the present invention relates to a method, apparatus, and computer instructions for provisioning in a network data processing system.

2. Description of Related Art

Network data processing systems are commonly used in all aspects of business and research. These networks are used for communicating data and ideas, as well as, providing a repository to store information. In many cases, the different nodes making up a network data processing system may be employed to process information. Individual nodes may have different tasks to perform. Additionally, it is becoming more common to have the different nodes work towards solving a common problem, such as a complex calculation. A set of nodes participating in a resource sharing scheme are also referred to as a "grid" or "grid network". For example, nodes in a grid network may share processing resources to perform complex computations, such as deciphering keys.

The nodes in a grid network may be contained within a network data processing system, such as a local area network (LAN) or a wide area network (WAN). These nodes also may be located in different geographically diverse locations. For example, different computers connected to the Internet may provide processing resources to a grid network. By applying the use of thousands of individual computers, large problems can be solved quickly. Grids are used in many areas, such as cancer research, physics, and geosciences.

The setup and management of grids are facilitated through the use of software, such as that provided by the Globus Toolkit and the IBM Grid Toolkit. The Globus Toolkit is an open source toolkit used in building grids. This toolkit includes software services and libraries for resource monitoring, discovery, and management, plus security and file management. The toolkit was developed by the Globus Alliance, which is based at Argonne National Laboratory, the University of Southern California's Information Sciences Institute, the University of Chicago, the University of Edinburgh, and the Swedish Center for Parallel Computers. The IBM Grid Toolkit is available from International Business Machines Systems, Inc. (IBM) for use with its systems.

Resources in a grid may provide grid services to different clients. A grid service normally uses a fixed pool of servers to provide a "best-efforts" allocation of servers to incoming requests. In many installations, numerous types of grid clients may be present in which each type may have different business priorities or requirements. Typical grid implementations do not have any mechanism to guarantee some specific level of service to different types of clients. As a result, most grid systems are grossly over-provisioned in terms of the number of servers to be safe. Such a setup results in inefficiencies in server usage and increases costs in implementing grids.

Therefore, it would be advantageous to have an improved method, apparatus, and computer instructions for provisioning resources in a network data processing system, such as a grid.

SUMMARY OF THE INVENTION

The present invention provides a method for provisioning grid resources for a set of grid services. The service performance for the set of grid services is monitored. The set of grid services has a set of service level agreements. In response to monitoring service performance, a determination is made as to whether current allocations of grid resources is sufficient to maintain performance levels for the set of grid services to meet the set of service level objectives. In response to the current allocations being insufficient to maintain the performance levels, the current allocations of the grid resources are dynamically reallocated or provisioned for the set of grid services to maintain service levels for the set of grid services.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram of a system used to provision grid resources in accordance with a preferred embodiment of the present invention;

FIG. 8 is a flowchart of a process for provisioning servers in a grid for different grid services in accordance with the preferred embodiment of the present invention; and FIG. 9 is a flowchart of a process for identifying a number of servers needed in accordance with the preferred embodiment of the present invention.

DETAILED DESCRIPTION OF THE PREFERRED EMBODIMENT

Figure 1:
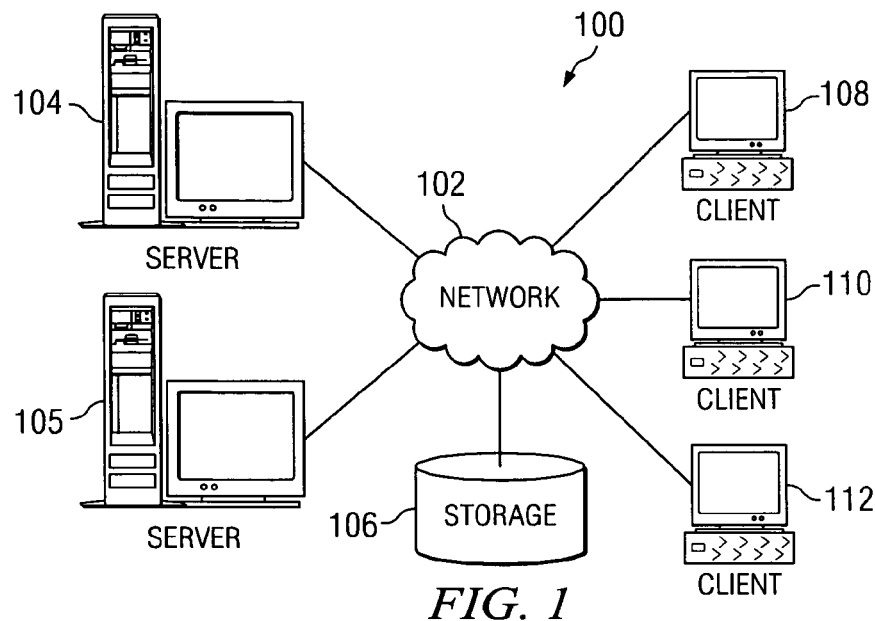
FIG. 1 is a pictorial representation of a network of data processing system in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 and server 105 are connected to network 102 along with storage unit 106. In addition, clients 108, 110, and 112 are connected to network 102. These clients 108, 110, and 112 may be, for example, personal computers or network computers. In the depicted example, server 104 and server 105 provide data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

These data processing systems include clients and nodes in a grid. For example server 104 and server 105 may be nodes that are part of a grid, along with other data processing systems not shown in this example. Clients 108-112 may be clients that request grid services or may be additional nodes in the grid.

Figure 2:
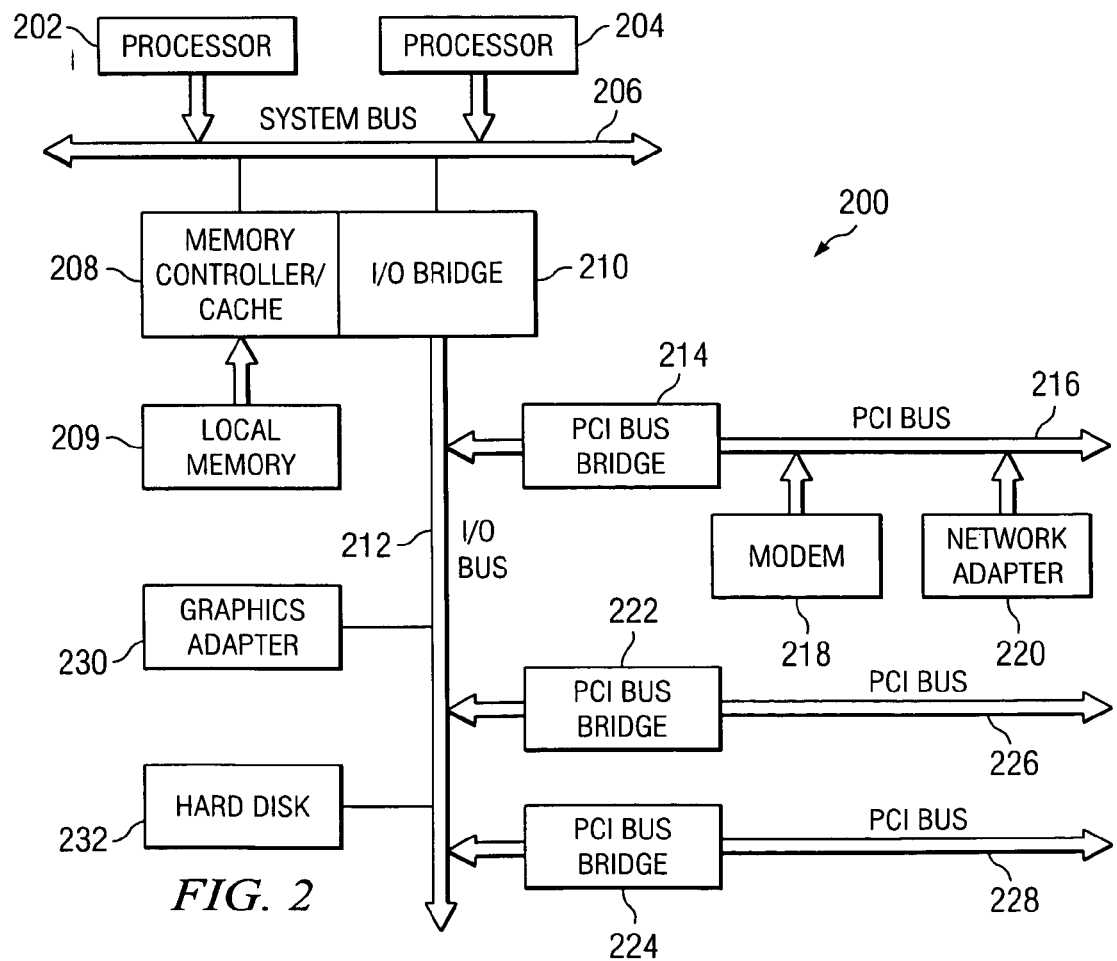
FIG. 2 is a block diagram of a data processing system that may be implemented as a server in accordance with a preferred embodiment of the present invention.

Referring to FIG. 2, a block diagram of a data processing system that may be implemented as a server, such as server 104 or server 105 in FIG. 1, is depicted in accordance with a preferred embodiment of the present invention. Data processing system 200 is an example of a data processing system that may be used to implement a node in a grid.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
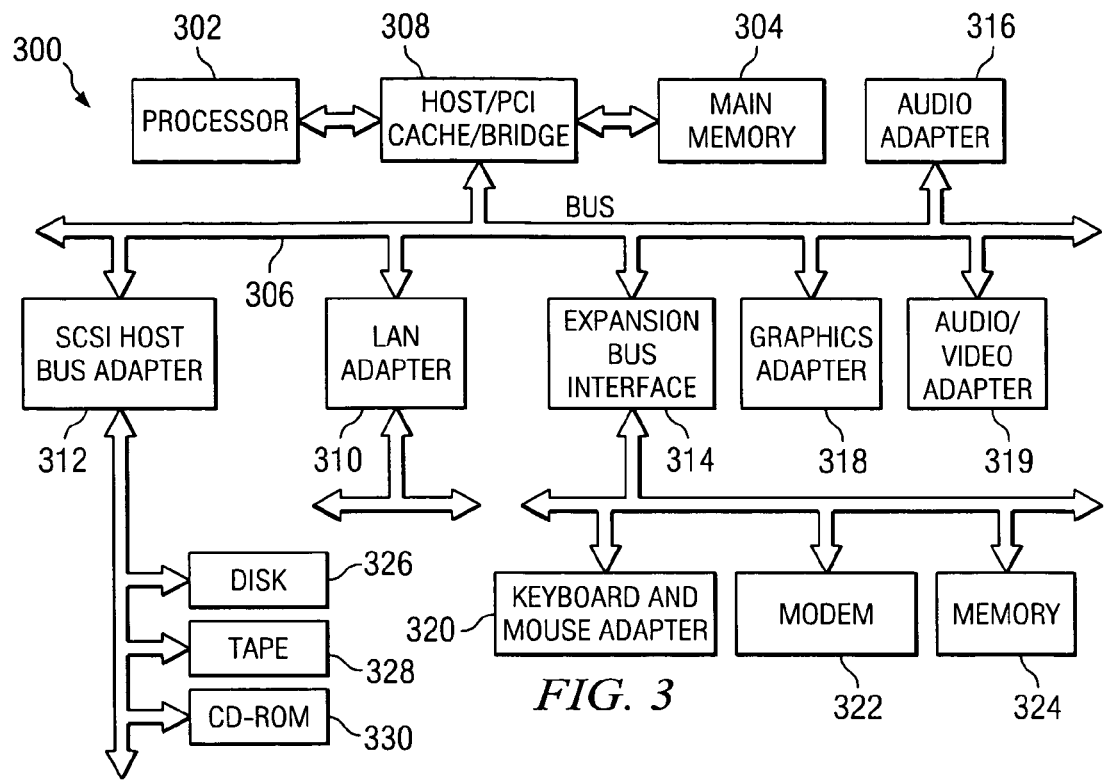
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
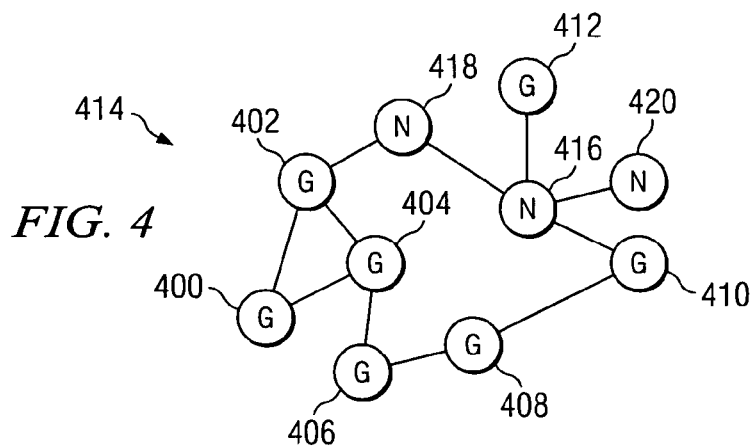
FIG. 4 is a diagram illustrating components used in distributing logical units in a network data processing system in accordance with a preferred embodiment of the present invention.

With reference now to FIG. 4, a diagram illustrating components used in distributing logical units in a network data processing system is depicted in accordance with a preferred embodiment of the present invention. In this example, nodes, 400, 402, 404, 406, 408, 410, and 412 are nodes in grid 414. Nodes 416, 418, and 420 are nodes that are not part of grid 414. These nodes may be located in a network data processing system such as network data processing system 100 in FIG. 1. In this example, these nodes are all nodes that are part of a network such as, the Internet, an intranet, a local area network, a wide area network or some combination of these and other types of networks.

The present invention provides a method, apparatus, and computer instructions for provisioning grid resources, such as servers to meet service levels that may have been set for different grid services. The mechanism of the present invention provides an ability to guarantee a specific level of service to clients. This level of service is also referred to as a service level agreement or service level objective. The particular level of service may be, for example, a maximum response time for a request, completing jobs by fixed time, or availability of servers for processing requests.

The mechanism of the present invention allows the total number of servers to be reduced when compared to the provisioning system currently being used. The mechanism of the present invention sets up a separate grid service for each class of client and automatically moves servers between the grid services to guarantee a level of performance needed to meet service level objectives set for the different classes. In the illustrative examples, clients may be divided into different classes or types. For example, clients may be divided into classes based on the business or organization to which the client belongs. Further, clients may be divided into classes based on a service level that is expected or guaranteed for clients in a particular class. Grid services may be created for each level of service in these examples.

Figure 5:
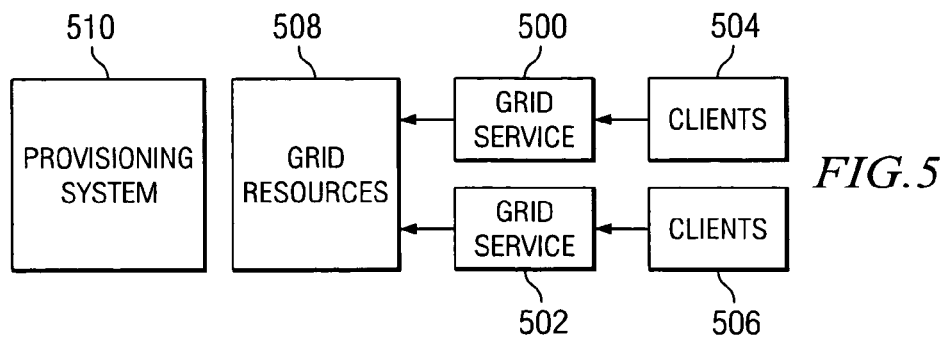
FIG. 5 is a diagram illustrating components used in providing grid services in accordance with a preferred embodiment of the present invention.

The mechanism of the present invention uses a adaptive statistical queuing model to predict the number of servers needed for a particular class. With reference now to FIG. 5, a diagram illustrating components used in providing grid services is depicted in accordance with a preferred embodiment of the present invention. In this illustrative example, grid service 500 and grid service 502 are provided for two classes of clients, clients 504 and clients 506. The different grid services provide different levels of service to the clients. For example, grid service 500 may provide a shorter maximum response time than grid service 502. Grid resources 508 is provisioned or allocated between grid service 500 and grid service 502 to perform tasks for these grid services.

These grid resources are allocated or provisioned using provisioning system 510. This provisioning system dynamically allocates and reallocates grid resources 508 in a manner that allows grid service 500 and grid service 502 to provide the level of performance based on a service level objective that is associated with or assigned to each grid service. As the loads or number of requests to grid service 500 and grid service 502 change, provisioning system 510 may dynamically provision grid resources 508 to change servers that are assigned to the different grid resources. Grid service 500 and grid service 502 provides information regarding service performance to provisioning system 510 for use in determining whether reallocation is required for grid resources 508.

Turning next to FIG. 6, a diagram of a system used to provision grid resources is depicted in accordance with a preferred embodiment of the present invention. Grid job scheduler 600 is a grid component used to schedule jobs or tasks in response to receiving requests from clients. This component schedules tasks for a particular grid service, such as grid service 500 in FIG. 5 in these examples. Each grid service includes a separate grid job scheduler, such as grid job scheduler 600. Grid job scheduler 600 distributes tasks to different nodes, such as servers that are assigned to the grid service. The number of servers are allocated and identified using object analyzer 602, resource manager 604, and deployment engine 606.

Object analyzer 602 uses information, such as the throughput achieved by grid job scheduler 600 and service level objective (SLO) to determine the number of servers that are required for the particular grid service. Resource manager 604 identifies the number of servers needed based on the input from objective analyzer 602 and input from other objective analyzers for other grid services. In other words, resource manager 604 determines allocations of grid resources for a number of grid services. This component receives requirements for servers or network devices from all the application controllers, such as object analyzer 602 for a grid service and manages the overall optimization in allocating grid resources, such as servers. Resource manager 604 has two primary responsibilities: makes optimal resource allocation decisions, and ensures a stable control over the grid infrastructure. Considering the different server requirements for each grid service, resource manager 604 determines where the servers are to be allocated.

The actual implementation or reallocation of servers is performed by deployment engine 606. This component is responsible for the creation, the storage, and the execution of repeatable workflows that automate the server configuration and allocation in the system. A workflow can represent either an entire reconfiguration process affecting multiple servers, or a single step in a larger reconfiguration process.

Resource manger 604 and deployment engine 606 may be implemented using components from IBM Tivoli Intelligent Orchestrator, which is a produce available from International Business Machines Corporation. Data, such as the number of servers needed for a grid service, may be used as input into this product to provide for provisioning of grid resources. Alternatively, other types of resource managers may be implemented or created depending on the type of provisioning system desired. With respect to objective analyzer 602, this component may be implemented in a number of different ways. In these illustrative examples, a statistical queue model may be used in objective analyzer 602 to estimate the additional resources needed to compensate the difference between the current capacity of the grid system (actual throughput) and the effective average arrival rate of the job requests. Consistent information about the state of data center information is provided by data center model (DCM) 608. Object analyzer 602, resource manager 604, and deployment agent 606 all use a central model/repository, such as DCM 608, to share information about the state of the data center.

Figure 7:
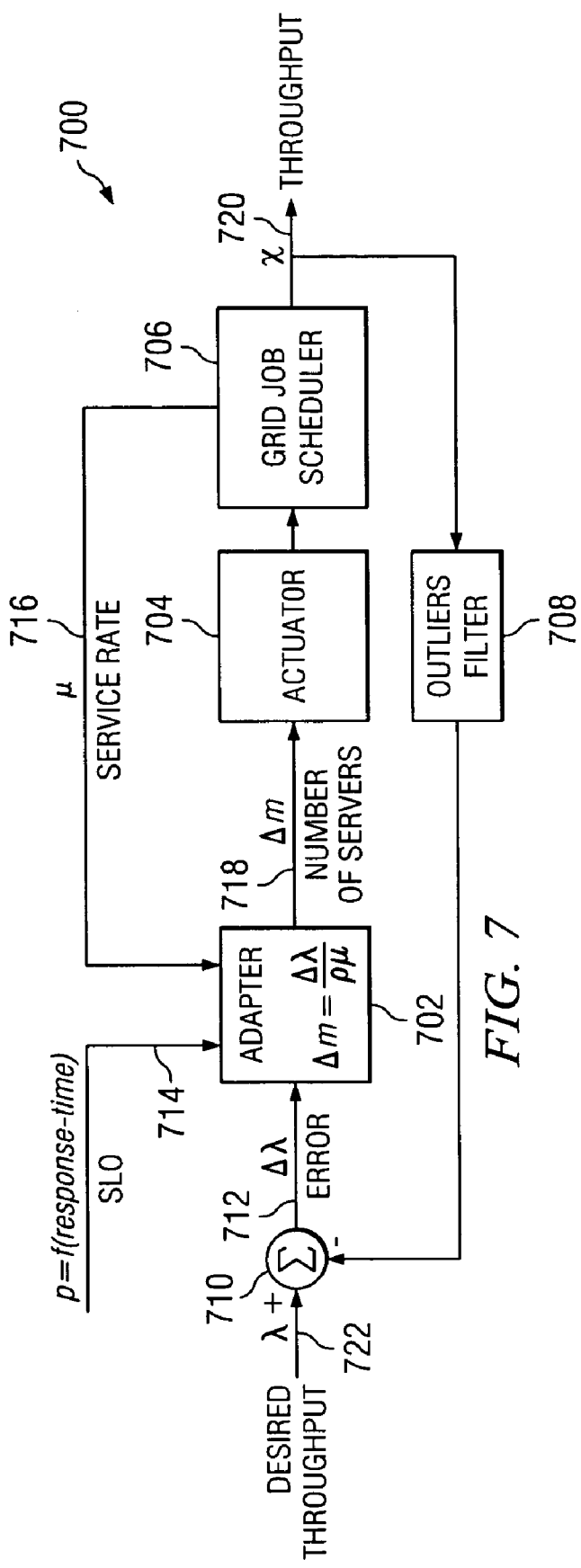
FIG. 7 is an adaptive control system used to provide a throughput that meets a desired throughput in accordance with a preferred embodiment of the present invention.

Turning next to FIG. 7, an adaptive control system used to provide a throughput that meets a desired throughput is depicted in accordance with a preferred embodiment of the present invention. In these examples, the throughput is the current capacity of the grid with the desired throughput being the desired capacity of the grid. In these examples, throughput is measured as a number of tasks executed per second by a grid service. The capacity in these examples is a maximum throughput that can be provided by the grid services.

Adaptive control system 700 includes adapter 702, actuator 704, grid job scheduler 706, outliers filter 708, and summing unit 710. Adapter 702 may be implemented using an objective analyzer, such as object analyzer 602 in FIG. 6. Actuator 704 may be implemented using resource manager 604 and deployment engine 606 in these illustrative examples.

Adapter 702 receives error signal 712, service level objective (SLO) 714 and service rate 716 as inputs to determine number of servers 718. Error signal 712 is generated from throughput 720 and desired throughput 722. A negative value of throughput 720 is filtered by outliers filter 708 and is added or summed with desired throughput 722 to create error signal 712. Service rate 716 is provided by grid job scheduler 706 in this example. In these illustrative examples, service level objective 714 may be found in a DCM, such as DCM 608 in FIG. 6. Outliers filter 708 is used to remove data points that are farther away from the expected throughput to smooth out changes in throughput 720.

Number of servers 718 is generated by adapter 702 in response to these inputs. Adapter 702 uses an adaptive statistical queuing model in these illustrative examples to estimate how many servers, such as number of servers 718, are needed to maintain the desired service level represented by desired throughput 722. Various parameters in this model are changed based on the dynamics of the grid system. These parameters include, for example, service rate and/or queue depth. Number of servers 718 in these examples is a prediction of the probability that a breach of service will occur. More information on generating this probability is described in "Three Dimensional Surface Indicating Probability of Breach of Service Level", application Ser. No. 10/870,224, filed Jun. 17, 2004, which is incorporated herein by reference.

Number of servers 718 is used by actuator 704, which receives data or input from adapter 702 and other adapters for other grid services to allocate available grid resources to the different grid services based on the received data or input. If the service level cannot be maintained for all of the grid services, the resource manager may allocate available resources based on the relative priority of the grid services. These priorities may be stored in a DCM, such as DCM 608 in FIG. 6.

For a grid system containing m nodes and one job scheduler (queuing system), $\mu$ is the average service rate per job. If $\lambda$ is the arrival rate and $\rho$ is the average utilization for a node, then the following equation may be used to represent the average realization for a node:

$$\rho = \frac{\lambda}{m\mu} \quad (1)$$

Or:

$$m_{req} = \frac{\lambda}{\rho\mu} \quad (2)$$

Where $m_{req}$ is the minimum number of servers required to handle the arrival rate $\lambda$ while the average utilization is maintained at the value of $\rho$. The throughput $\chi$ of the system is given by:

$$\chi = m_{cur}\rho\mu \quad (3)$$

Where $m_{cur}$ is the current number of servers. Equation (3) can be rewritten as:

$$m_{cur} = \frac{\chi}{\rho\mu} \quad (4)$$

The difference between $m_{req}$ and $m_{cur}$ provides the number of servers required to handle the overload:

$$\Delta m = m_{req} - m_{cur} \quad (5)$$

And:

$$\Delta m = \frac{\lambda - \chi}{\rho\mu} \quad (6)$$

From (6), if $\Delta\lambda = \lambda - \chi$ is replaced, the following equation is provided:

$$\Delta m = \frac{\Delta\lambda}{\rho\mu} \quad (7)$$

This final equation provides the control law for the number of servers based on the arrival rate error. The average utilization $\rho$ can be used as an external knob, which sets a critical threshold and indirectly controls the SLO. It can be expressed as a function of response time.

The average service time is the adaptive component of adapter 702 and is continuously tuned up by a feedback from grid job scheduler 706.

With reference now to FIG. 8, a flowchart of a process for provisioning servers in a grid for different grid services is depicted in accordance with the preferred embodiment of the present invention. The process illustrated in FIG. 8 may be implemented in resource manager, such as resource manager 604 in FIG. 6.

The process begins by receiving the number of servers from object analyzers (step 800). This input may be received from each object analyzer that is associated with a grid service. In these examples, the number of servers takes the form of a probability that a service level breach will occur for a given number of servers. Of course, the number of servers may take other forms depending on the implementation, such as the requested or desired number of services needed for the grid service.

Next, the number of servers is analyzed with respect to current server allocations to grid services and service level objectives (step 802). Then, a determination is made as to whether change in provisioning is needed (step 804). The implementation in step 804 will vary depending on the particular implementation. The determination made in step 804 may be performed in a number of different ways. For example, this determination may be based on the availability of the servers and the relative priority of the grid services if a contention occurs. If a change in provisioning is needed, servers are reprovisioned (step 806) with the process then returning to step 800 as described above. This change may involve, for example, moving one or more servers from one grid service to another grid service. As another example, two or more servers may be moved from one grid service to two other grid services.

Referring back to step 804, if a change in provisioning is not needed, the process returns to step 800 as described above.

With reference now to FIG. 9, a flowchart of a process for generating a number of servers needed is depicted in accordance with the preferred embodiment of the present invention. The process illustrated in FIG. 9 may be implemented in an objective analyzer, such as object analyzer 602 in FIG. 6.

The process begins by receiving error data, service level objective, and service rate (step 900). Next, probability of a breach of service level agreement is generated from the received data (step 902) with the process terminating thereafter. This probability forms the number of servers sent to the resource manager by the objective analyzer in these illustrative examples. For example, this output may be that 10 servers will result in a 80 percent chance that the service level objective will be breached or that 60 servers will result in a 20 percent chance that the service level will be breached.

Thus, the present invention provides an improved method, apparatus, and computer instructions for provisioning grid resources to clients. The mechanism of the present invention provides grid services for different service level objectives. Clients may be assigned to the different grid services based on service level objectives specified by the clients. The mechanism of the present invention dynamically reallocates grid resources to maintain service levels for these grid resources. In this manner, the number of servers required to process tasks may be reduced from the numbers currently provisioned without the dynamic provisioning system of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for provisioning grid resources for a set of grid services, the method comprising:
    receiving a plurality of requests from a plurality of clients that use the set of grid services, wherein the set of grid services has a set of service levels, wherein the set of grid services provides different service levels to respective clients, wherein the plurality of clients are divided into classes based on specified service levels for the respective clients, wherein a separate grid service is set-up for each service level and each class of client, wherein a specific grid resource is allocated to a single grid service, and wherein each grid service in the set of grid services is allocated a plurality of grid resources;
    distributing tasks associated with the plurality of requests to the plurality of grid resources allocated to respective grid services in the set of grid services, wherein the tasks are distributed according to the service level and the class of respective requesting clients;
    monitoring service performance of each of the set of grid services, wherein each grid service in the set of grid services has an assigned service level objective;
    responsive to monitoring service performance levels of the set of grid services, determining whether current allocations of grid resources for each grid service in the set of grid services is sufficient to maintain service performance levels for each grid service in the set of grid services to meet the assigned service level objective of each grid service in the set of grid services, further comprising:
    predicting a number of servers needed to maintain a service level that meets the assigned service level objective for each grid service in the set of grid services to form predicted allocations of grid resources; and
    determining whether the current allocations of grid resources for each grid service in the set of grid services are sufficient to meet the predicted allocations of grid resources; and
    responsive to the current allocations of grid resources for each grid service in the set of grid services being insufficient to maintain at least some service performance levels, dynamically reallocating the current allocations of the grid resources to the set of grid services to maintain assigned service level objectives for each grid service in the set of grid services to form dynamic allocations of grid resources, wherein the dynamic allocations maintain the service levels for each grid service in the set of grid services as loads associated with a portion of the plurality of requests change for each grid service in the set of grid services.

2. The method of claim 1, wherein the dynamically reallocating step includes:
    moving a server from one grid service to another grid service in the set of grid services.

3. The method of claim 1, wherein the predicting step uses an adaptive statistical queuing model to predict the number of servers.

4. The method of claim 1, wherein the determining step includes:
    receiving a desired throughput, a service level objective, a service rate, and an error signal for each grid service in the set of grid services; and
    selecting the number of servers for the each grid service in the set of grid services using the desired throughput, the service level objective, the service rate, and the error signal.

5. The method of claim 4, wherein the receiving step and the selecting step are performed by an objective analyzer.

6. The method of claim 4, wherein the error signal is a difference between the desired throughput and a throughput for a job scheduler.

7. The method of claim 6, wherein the throughput is filtered to remove outliers.

8. The method of claim 1, wherein the distributing step is performed by job schedulers, wherein each grid service in the set of grid services includes a separate job scheduler.

9. The method of claim 1, wherein the monitoring step and the dynamically reallocating step are performed by a resource manager.

10. The method of claim 1, wherein a first reallocated grid resource is located in a different geographic location in a network than a second reallocated grid resource is located.

* * * * *